June 5, 1945.   A. FEINDEL   2,377,334
ELECTRONIC DEVICE
Original Filed July 12, 1941
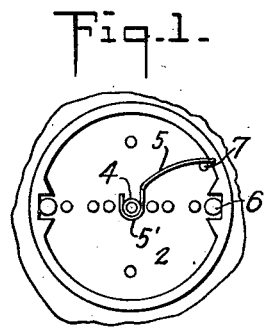
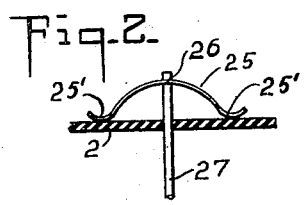
INVENTOR
ABBOTT FEINDEL
BY
Bartlett, Eyre, Keel & Weymouth
ATTORNEYS Patented June 5, 1945

2,377,334

UNITED STATES PATENT OFFICE 2,377,334

ELECTRONIC DEVICE

Abbott Feindel, East Orange, N. J., assignor to Tung-Sol Lamp Works, Inc., Newark, N. J., a corporation of Delaware Original application July 12, 1941, Serial No. 402,106. Divided and this application February 6, 1943, Serial No. 474,940

3 Claims. (Cl. 250—27.5)

This invention relates to radio tubes.

Microphonic response in radio tubes is often caused by the vibration of one or more elements. The vibrations are started and maintained by mechanical or acoustical coupling with the loud speaker of the radio receiver. This condition is often caused by a more or less loose fit by the various elements in the holes of the mica spacers which are used to locate and fix the elements. While these holes can be made sufficiently small to prevent vibration, it is not always practicable to make them that small due to the difficulty of inserting the elements into and through the holes. Moreover, even if the holes are made very small at the beginning, it has been observed that they become enlarged due to the insertion of the elements and due to the heating of the parts during processing. The vibrations might be prevented or reduced by locking all elements securely at both ends after assembly so that no vibration can take place, but this is impracticable because the elements must expand during the heat of processing, and if they are locked securely at both ends they will buckle or bow when heated, which is objectionable. Whatever means or method may be employed for preventing vibration, allowance for expansion must be provided for.

One object of the invention is a method and means for preventing the objectionable vibrations while allowing for the required expansion during processing and while in use. This object of the invention is accomplished by taking advantage of the fact that the elements of a radio tube are usually fastened securely at one end and therefore expand toward the other end, and by providing suitable means at the other end for preventing vibration but allowing expansion.

More particularly, this object of the invention is effected by providing vibration-preventing means at the ends of the elements which are not fastened securely, the vibration-preventing means engaging the element or elements in a manner to prevent or dampen vibrations thereof.

Further objects of the invention will hereinafter appear.

For a better understanding of the invention reference may be had to the accompanying drawing forming a part of this application wherein—

Fig. 1 is a horizontal sectional view of a radio tube embodying the invention;

Fig. 2 is a vertical sectional view of a portion of a radio tube illustrating a different embodiment of the invention and;

Fig. 3 is a sectional view similar to Fig. 2 but illustrating still another embodiment of the invention.

Referring to Fig. 1, the conventional top insulating, as for example, mica disc 2 of a tube is shown through which the various elements pass. According to this embodiment of the invention objectionable vibrations of the cathode element 4 are prevented by means of a spring wire 5 which is fastened as by welding to an insulated member 7 of the tube and is provided with a hook 5' laterally engaging the projecting end of the cathode 4 above the mica disc 2. The spring wire yieldingly laterally engages the cathode 4 so as to prevent vibrations and permit contraction and expansion.

In the embodiment of Fig. 2 a spring wire 25 of arch shape is welded at an intermediate point 26 to an element support 27 with the free ends 25' of the spring 25 engaging disc 2 and applying spring pressure thereto. The support 27 may therefore contract and expand freely against the tension of the spring 25 and the latter holds the support firmly against vibrations which cause microphonic response, in any contracted or expanded position.

In the embodiment of Fig. 3 a relatively large aperture 29 is made in the insulating disc 2 of mica or the like, and a bowed spring 30 is welded at one end to an element or support 31 and bears against the same just below the insulating disk 2. The pressure of the spring 30 against the disc 2 prevents vibration of the element or support 31.

The present application is a division of my copending application Ser. No. 402,106, filed July 12, 1941.

I claim:

1. In a radio tube having its elements securely fastened at one end, an insulating disc through which said elements freely pass, and means yieldingly engaging at least one of said elements in the vicinity of said insulating disc to reduce vibrations and prevent microphonic responses, said means comprising a spring member of arcuate form with its ends and central portion on the convex side thereof engaging the disc and said element in a manner to resist but not prevent contraction and expansion but to reduce vibrations.

2. In a radio tube having its elements securely fastened at one end, an insulating disc through which said elements freely pass, and means yieldingly engaging at least one of said elements in the vicinity of said insulating disc to reduce vibrations and prevent microphonic responses, said means comprising a bowed spring secured at one end to said element and engaging said element at another point, with the bowed portion thereof engaging said disc under pressure.

3. In a radio tube having its elements securely fastened at one end, an insulating disc through which said elements freely pass, and yieldable means in the vicinity of said disc coupling together said disc and one of said elements to reduce vibrations and prevent microphonic responses, said means comprising a bowed spring contacting said element and disc along curved portions of its center and ends, the contact along two of said portions being slidable engagements and that at the third being a fixed engagement to said element adjacent the end thereof.

ABBOTT FEINDEL.